(12) United States Patent
Beesley et al.

(10) Patent No.: US 12,418,943 B2
(45) Date of Patent: Sep. 16, 2025

(54) MESH NETWORK USING TRANSPARENT TUNNELING OVER A WIRELESS NETWORK

(71) Applicant: Fujitsu Limited, Kawasaki (JP)

(72) Inventors: William Beesley, Murphy, TX (US); Srinath Sarang, Cupertino, CA (US); Olufemi Adeyemi, Frisco, TX (US)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 18/107,959

(22) Filed: Feb. 9, 2023

(65) Prior Publication Data

US 2024/0276568 A1 Aug. 15, 2024

(51) Int. Cl.
*H04W 76/12* (2018.01)
*H04L 61/256* (2022.01)

(52) U.S. Cl.
CPC ........... *H04W 76/12* (2018.02); *H04L 61/256* (2013.01)

(58) Field of Classification Search
None
See application file for complete search history.

(56) References Cited

U.S. PATENT DOCUMENTS

| | | | |
|---|---|---|---|
| 10,361,970 B2* | 7/2019 | Beesley | ................ H04L 47/788 |
| 2017/0085529 A1* | 3/2017 | Finkelstein | ......... H04L 12/4633 |
| 2024/0205988 A1* | 6/2024 | Beesley | ............. H04L 61/2514 |

* cited by examiner

*Primary Examiner* — Yaotang Wang
(74) *Attorney, Agent, or Firm* — Maschoff Brennan (57) ABSTRACT

In an example, a method may include a configuration file being provided to a first device from a network server. The configuration file may be provided after establishment of a first wireless connection over a wireless network between the first device and the network server. The configuration file may direct the first device to establish a virtual bridge and the network server may be configured to map a first tunnel and/or a second tunnel to the virtual bridge. The configuration file may further direct the first device to establish the first tunnel between the virtual bridge and the network server. The configuration file may also direct the first device to establish the second tunnel within the first tunnel. The second tunnel may be established. The method may also include facilitating communications between the first device and a second device via the virtual bridge using the second tunnel.

20 Claims, 3 Drawing Sheets

MESH NETWORK USING TRANSPARENT TUNNELING OVER A WIRELESS NETWORK

FIELD

The embodiments discussed in the present disclosure are related to a mesh network using transparent tunneling over a wireless network.

BACKGROUND

Some wireless networks employ various protocols to provide simplicity for a user of the wireless network and/or security to the wireless network and devices using the wireless network. Some protocols may include data routing to recipient devices, which may be performed by a router device and/or manual provisioning of port forwarding rules. In some instances, communications may be slowed or impeded when routing protocols may not be bypassed. Further, in some instances, a device may not include access to a router device and/or the user thereof may not be able to implement port forwarding rules to connect one device with another device in the wireless network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include a configuration file being provided to a first device from a network server. The configuration file may be provided after establishment of a first wireless connection over a wireless network between the first device and the network server. The configuration file may direct the first device to establish a virtual bridge. The location of the virtual bridge may be defined within the configuration file. The network server may be configured to map a first tunnel and a second tunnel to the virtual bridge. The virtual bridge may be configured to provide a mesh network for wireless communications between at least the first device and a second device. The configuration file may direct the first device to establish the first tunnel via a first layer of an internet protocol suite via a second wireless connection over the wireless network between the virtual bridge and the network server. The configuration file may direct the first device to establish the second tunnel within the first tunnel between the virtual bridge and the network server. The second tunnel may be established via a second layer of the internet protocol suite. The method may also include facilitating communications between at least the first device and the second device via the virtual bridge using the second tunnel.

The object and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

As citizens broadband radio service (CBRS) and/or other public spectrum of radio frequencies increase in popularity and use, such as use in cellular networks, some wireless networks, which may include temporary wireless networks, experience a related increase in popularity and use. Communications between one or more devices over a wireless network, such as a cellular network, may be mapped to a recipient device through a router using network address translation (NAT). In some circumstances, the presence of NAT on a core device (e.g., a network server) and/or an edge device (e.g., an agent device) may limit communications associated with the agent device in the absence of manual provisioning of port forwarding rules associated with the agent device. The port forwarding rules may contribute to mapping communications intended for the agent device such that the agent device may obtain communications and/or service, such as from the network server, via the wireless network. In some circumstances, the port forwarding rules may include difficult implementations, such as ensuring data is redirected to the intended destination, and/or the port forwarding rules may be performed and/or maintained by an operator of the wireless network (e.g., a network server operator), which may limit the availability of the port forwarding rules and, by extension, communications intended for the agent device.

In some prior approaches, an internet protocol security (IPsec) tunnel may be established in a wireless network to overcome the communication issues that may be associated with NAT, such as between the agent device and the network server. An IPsec tunnel may include communications at the internet layer of the internet protocol suite. In some circumstances, the IPsec tunnel may provide an encrypted communication channel and may use a router or routing methods (e.g., port forwarding rules) to direct communications to intended recipients in the wireless network. Alternatively, custom routing and port mapping of the agent device may overcome the communication issues that may be associated with NAT in the wireless network. Custom routing and port mapping may include network service operator defined and/or user defined forwarding rules for communications to be directed to the intended recipient, which may operate similarly to a router in a wireless network. In either method of overcoming NAT communication issues (e.g., IPsec tunneling or custom routing and port mapping), the wireless network may not be transparent relative to the connected devices (e.g., the agent device and the network server) in the wireless network such that non-internet protocol (IP) traffic (e.g., communications at the link layer of the internet protocol suite) may not be supported by the wireless network. Further, both methods may need one or more configurations on the agent device and/or the network server to overcome the NAT communication issues which may be time consuming for the user of the agent device or the network server operator, technically difficult to implement, and/or prone to error during the implementation. For example, a mistake included in a portion of the port forwarding rules may cause communications between devices in the wireless network to not be received and/or fail, such that communications between devices in the wireless network may not be received.

In some aspects of the present disclosure, a first device may include a first wireless connection with a network server over a wireless network, which may include limitations to communications therebetween, such as NAT communications issues described herein. The first device may begin to establish a second wireless connection between a virtual bridge and the network server by requesting a configuration file from the network server. In some embodiments, the second wireless connection may facilitate communications between at least the first device and the second device via a mesh network and may not include the NAT communication issues described herein. In some embodiments, the configuration file may be provided to the first device from the network server after establishment of the first wireless connection over the wireless network between the first device and the network server. In these or other embodiments, the first device may utilize a NAT protocol, the network server may utilize a NAT protocol, and/or the second device may utilize a NAT protocol, any of which may cause a lack of transparency during communications between one another. In some embodiments, addressing information associated with the first device, the second device, and/or the virtual bridge may be included in the configuration file.

In some embodiments, the configuration file may include one or more instructions that may direct the first device to establish a virtual bridge. The location of the virtual bridge may be defined in the configuration file. In some embodiments, the network server may be configured to map a first tunnel and/or a second tunnel to the virtual bridge. In some embodiments, the virtual bridge may be configured to provide a mesh network for wireless communications, which may support communications between the first device and at least a second device via the virtual bridge.

In some embodiments, the configuration file may include one or more instructions that may direct the first device to establish the first tunnel (e.g., an IPsec tunnel) via a first layer (e.g., the internet layer) of an internet protocol suite via a second wireless connection over the wireless network between the virtual bridge and the network server. In some embodiments, the one or more instructions included in the configuration file may direct the first device to establish the second tunnel (e.g., a layer 2 tunneling protocol (L2TP) tunnel) within the first tunnel between the virtual bridge and the network server. In some embodiments, the second tunnel may be established via a second layer (e.g., the link layer) of the internet protocol suite. The second tunnel may support link layer communications (e.g., media access control (MAC)-based addressing) between at least the first device and the second device via the virtual bridge and using the second tunnel.

In some embodiments, a second tunnel may provide transparency between at least two devices (e.g., the first device and the second device) configured to use the virtual bridge via the second tunnel, such that NAT protocols in one or both devices may be bypassed. In some embodiments, the second tunnel may be operably similar to a wire (e.g., an ethernet cable) physically connecting the at least two devices. In these or other embodiments, the second tunnel and/or the virtual bridge may support communications using internet protocol (IP) traffic (e.g., addressing defined by RFC 1918) and/or non-IP traffic (e.g., circuit emulated time division multiplexing (TDM), recommended standard (RS)-232 (serial communications), high-definition multimedia interface (HDMI) over ethernet, etc.).

Embodiments of the present disclosure will be explained with reference to the accompanying drawings.

Figure 1:
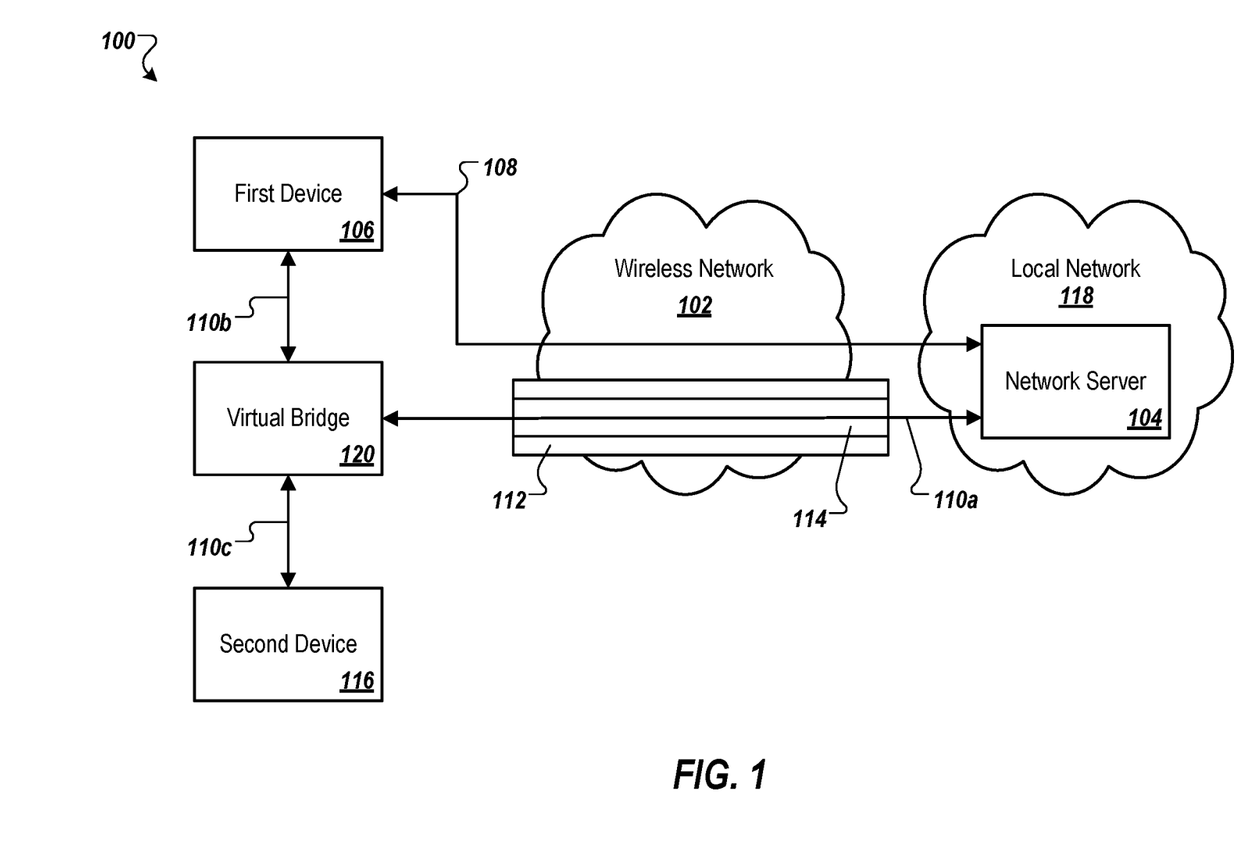
FIG. 1 is a block diagram of an example environment configured to support a mesh network using transparent tunneling over a wireless network.

FIG. 1 is a block diagram of an example environment 100 configured to support a mesh network using transparent tunneling over a wireless network, in accordance with at least one embodiment of the present disclosure. In the present disclosure, transparency, such as transparency between two or more devices, may refer to supporting communications between devices that may use a link layer of the internet protocol suite (e.g., TCP/IP), such as via media access control (MAC) addressing. The environment 100 may include a wireless network 102, a network server 104, a first device 106, a second device 116, a local network 118, and a virtual bridge 120.

In some embodiments, the wireless network 102 may be configured to communicatively couple two or more systems and/or devices ("two or more devices") together, such as the network server 104 and the first device 106 and/or the network server 104 and the virtual bridge 120. In some embodiments, the wireless network 102 may be any network or configuration of networks configured to send and receive communications between the two or more devices. In some embodiments, the wireless network 102 may include one or more wireless networks, and may include numerous different configurations, including multiple different types of networks, network connections, and protocols to communicatively couple the two or more devices in the environment 100. For example, in some embodiments, the wireless network 102 may include one or more cellular networks that may wirelessly connect the two or more devices, such as at least the network server 104 with the first device 106 via a first wireless connection 108, and/or the network server 104 with the first device 106 and/or the second device 116 through the virtual bridge 120 via a first wireless tunnel connection 110a (e.g., between the network server 104 and the virtual bridge 120), a second wireless tunnel connection 110b (e.g., between the virtual bridge 120 and the first device 106), and a third wireless tunnel connection 110c (e.g., between the virtual bridge 120 and the second device 116), referred to collectively as a second wireless connection 110, as described herein.

In some embodiments, the local network 118 may be configured to communicatively couple the network server 104 with one or more other devices. In some embodiments, the local network 118 may be any network or configuration of networks configured to send and receive communications between the network server 104 and other devices included in the local network 118. In some embodiments, the local network 118 may include a wired network, an optical network, and/or a wireless network, and may include numerous different configurations, including multiple different types of networks, network connections, and protocols to communicatively couple the network server 104 with other systems and/or devices that may be included in the local network 118. In some embodiments, the local network 118 may be a local area network (LAN) and may support direct connections between devices and/or multipoint connections, such as connections between two or more devices via a switch. In some embodiments, the local network 118 may be configured to support link layer communications between connected devices, such as via Institute of Electrical and Electronics Engineers (IEEE) 802 network standards (e.g., ethernet, Wi-Fi, and the like).

In some embodiments, the network server 104, the first device 106, and/or the second device 116 may individually include a network address translation (NAT) protocol for directing network traffic that may be used during communications via the wireless network 102. For example, the network server 104 may include a NAT protocol, the first device 106 may include a NAT protocol, and the second device 116 may include a NAT protocol that may be used in conjunction with communications via the wireless network 102. In some instances in which NAT protocols are included in devices communicating using the wireless network 102, one or more routers may be included in a communication channel using the wireless network 102, where the routers may redirect communications within the wireless network 102. Alternatively, or additionally, in some instances in which NAT protocols are included in devices communicating using the wireless network 102, manual provisioning of port forwarding rules associated with one or more devices communicating via the wireless network 102 may be included in the communication channel using the wireless network 102. In some embodiments, provisioning may refer to one or more actions in preparation for enabling communications between devices in the wireless network 102. As such, manual provisioning may refer to a person (e.g., a user, a network operator, etc.) performing one or more actions that may enable communications between devices using the wireless network 102. In some embodiments, which may include the context above, manual provisioning of port forwarding rules may include a person establishing routing rules associated with one or more devices included in and/or using the wireless network 102 (e.g., similar to a router redirecting traffic between devices), such that traffic may be received by an intended recipient in view of NAT protocols included in the one or more devices communicating using the wireless network 102.

In some embodiments, the network server 104 may include a system and/or device that may facilitate connections between one or more devices, which may include one or more tunnels as described herein, and provide a channel for sharing resources, storing resources, and/or managing resources using the local network 118. In some embodiments, the network server 104 may manage the connections of devices that may be included in the local network 118 and/or potential connections of devices requesting access to the local network 118. For example, in instances in which a new device requests access to the local network 118, the network server 104 may determine whether to permit access to the new device and/or provide authentication credentials to the new device that may enable the new device to access the local network 118.

In some embodiments, the network server 104 may provide wireless and/or wired connections to connected devices in the local network 118. For example, a first device in the local network 118 may include a wired connection to the network server 104 and a second device in the local network 118 may include a wireless connection to the network server 104, and the first device and the second device may be communicatively coupled via the local network 118 provided by the network server 104. In some embodiments, the network server 104 may be configured to support one or more additional communication channels, such as a wireless connection via the wireless network 102 as described herein. In these or other embodiments, the network server 104 may include hardware and/or software that may facilitate communications via wired and/or wireless channels, such as transceivers, switches, and the like.

In some embodiments, a network operator may manage devices, manage communications, manage resources, and/or provide oversight to the local network 118 of the network server 104 via the network server 104. For example, the network operator may determine whether to permit or deny access to a new device seeking to access the local network 118, such as by providing authentication credentials or restricting authentication credentials from the network server 104 to the new device. In another example, the network operator may observe resource usage and/or resource sharing between devices and/or the network server 104 in the local network 118 as the resources may be routed through the network server 104 and/or visible/accessible by the network server 104. In another example, the network operator may have visibility of traffic (e.g., communications) between devices in the local network 118 as the traffic may be routed through the network server 104 and/or the network operator may limit or restrict communications between devices using the local network 118, such as by controlling traffic routed through the network server 104, which may be according to one or more communication rules associated with the local network 118 and/or the network server 104. In these or other embodiments, the network operator may be a person (e.g., a person with access to the network server 104) and/or a device which may include hardware and/or software and may be configured to make decisions based on predetermined rules or scenarios.

In some embodiments, the first device 106 may include a system and/or device that may include a wireless transceiver (e.g., a cellular transceiver), such that the first device 106 may be configured to communicate with other systems and/or devices via the wireless network 102. For example, the first device 106 may include customer-premises equipment (CPE) that may include a cellular transceiver such that the first device 106 may communicate wirelessly with one or more devices via the wireless network 102.

In some embodiments, in some circumstances the first device 106 may be disconnected from the local network 118, may be unable to communicate with devices included in the local network 118 using communication protocols associated with the local network 118, and/or generally may be unable to communicate with other devices using link layer communications. For example, the first device 106 may be disconnected from the local network 118 and/or one or more devices included in the local network 118 prior to establishing one or more tunnels, such as one or more tunnels between the network server 104 and the virtual bridge 120. Alternatively, or additionally, the first device 106 may be disconnected from the local network in response to an issue with the local network 118 or a network card of the first device 106. Alternatively, or additionally, prior to establishing one or more tunnels between the network server 104 and the virtual bridge 120, the first device 106 may be limited to non-tunnel communications using the wireless network 102. Non-tunnel communications may include at least non-link layer-based communications, such as one or more cellular signals and tunnel communications may include IP layer-based communications and/or link layer-based communications, such as MAC-based addressing, as described herein. Alternatively, or additionally, prior to the first device 106 obtaining a configuration file from the network server 104 (as described herein), the first device 106 may not include source and/or destination addressing for other devices (e.g., addressing that may be utilized to establish one or more tunnels, such as between the network server 104 and the virtual bridge 120) that may be used for establishing link layer-based communications such as via one or more tunnels through the wireless network 102, as described herein.

Alternatively, or additionally, prior to establishing one or more tunnels between the network server 104 and the virtual bridge 120, the first device 106 and/or the second device 116 may not have authentication credentials and/or access to authentication credentials that may be used in communications between one another through a mesh network for wireless communications provided by the virtual bridge 120, as described herein. In some embodiments, the first device 106 may be configured to establish a first wireless connection 108 with the network server 104 via the wireless network 102, where the first wireless connection 108 may include non-link layer-based communications. For example, prior to establishing one or more tunnels between the network server 104 and the virtual bridge 120, the first device 106 may attempt to and/or wirelessly connect to the network server 104 using the first wireless connection 108 over the wireless network 102 and the first device 106 may be communicatively coupled to the network server 104 via the first wireless connection 108, which may support non-link layer-based communications.

In some embodiments, the first wireless connection 108 may include one or more NAT protocols, such as NAT protocols associated with the network server 104 and/or NAT protocols associated with the first device 106, such that the first wireless connection 108 between the network server 104 and the first device 106 may not be transparent. In the present disclosure, transparency, such as transparency between two or more devices, may refer to supporting communications between devices that may use a link layer of the internet protocol suite (e.g., TCP/IP), such as via media access control (MAC) addressing. For example, a first device may use an address resolution protocol (ARP) to determine a link layer address (e.g., a MAC address) of a second device in the same internet protocol (IP) space. Devices considered in the same IP space may include devices that may be configured to use IP addressing to direct communications to one another, which may include direct addressing and/or routing via a router or port forwarding. For example, as illustrated in FIG. 1, prior to establishing one or more tunnels between the network server 104 and the virtual bridge 120, the network server 104, the first device 106, and the second device 116 may not be in the same IP space as one another and may not share IP-based connections. As illustrated and described herein, the inclusion of the one or more tunnels between the network server 104 and virtual bridge 120 may allow the network server 104, the first device 106, and/or the second device 116 to be in the same IP-space and may share IP-based connections between one another using direct communications and/or multipoint communications.

In an example, a first device and a second device may be configured to communicate (e.g., transmit and/or receive data) with one another by sending data packets to one another using link layer addressing (e.g., MAC addresses associated with the first device and the second device). In these or other embodiments, transparent communications may be performed without a router and/or port forwarding rules associated with the first device and/or the second device, such as in view of NAT protocols. For example, the link layer addressing may allow communications directly between at least the first device and the second device without using a protocol of a higher layer of the internet protocol suite to send the communications, such as a protocol of the internet layer of the internet protocol suite. Additionally, transparency may extend to one or more additional devices that may be included in the same IP space as the first device and/or the second device and similarly configured to support link layer addressing.

In some embodiments, prior to one or more tunnels being established between the network server 104 and the virtual bridge 120, the first device 106 may establish the first wireless connection 108 with the network server 104 over the wireless network 102, as described herein. Using the first wireless connection 108, the first device 106 may request a configuration file from the network server 104. In some embodiments, the request may include a request for device addressing information to be included in the configuration file, which may be used to establish the first wireless tunnel connection 110a between the network server 104 and the virtual bridge 120 and/or the second wireless tunnel connection 110b and/or the third wireless tunnel connection 110c between the first device 106 and the virtual bridge 120 and between the second device 116 and the virtual bridge 120, respectively. Alternatively, or additionally, the request may include a request for a network arrangement to be included in the configuration file, which may be implemented by the first device 106 (e.g., point-to-point communications, a point-to-multipoint communications, etc.) and/or the virtual bridge 120.

In some embodiments, the request for the configuration file may be determined by a user of the first device 106. For example, the user of the first device 106 may determine the information to include in the request. For example, the user of the first device 106 may determine that a connection with the second device 116 is desired. As such, the request may indicate that the virtual bridge 120 be established between the first device 106 and the second device 116, which may support communications between the first device 106 and the second device 116, by designating the first device 106, the second device 116, and the virtual bridge 120 in the request.

In some embodiments, the request for the configuration file may include desired connections between devices and/or a networking arrangement. In an example, the request may include a request to establish a mesh network via the virtual bridge 120 such that the first device 106, the second device 116, and/or one or more additional devices that connect to the virtual bridge 120 may be configured to communicate between each other as though in the same IP space (e.g., using link layer-based communications). In another example, the request may request a direct connection between devices, such as a direct connection between the first device 106 and the second device 116 where the direct connection may support link layer-based communications.

In another example of a request for the configuration file, the user may define a threshold for quality of service metrics that may be implemented in communications between devices, such as between the first device 106 and the second device 116 via the virtual bridge 120) and/or any other communications using the second wireless connection 110 (e.g., communications between the first device 106 and the network server 104 via the virtual bridge 120 and the second tunnel 114 after the establishment thereof). Alternatively, or additionally, the request may include a selection from one or more predetermined configuration files. For example, the user of the first device 106 may select the virtual bridge 120 to be designated as an end of the second wireless connection 110 from a list of one or more potential devices and/or locations for the second wireless connection 110 with the network server 104.

In some embodiments, the network server 104 may obtain the request for the configuration file from the first device 106. In some embodiments, the network server 104 may determine one or more configuration parameters in response to the obtained request, and the configuration parameters may be included in the configuration file that may be generated by the network server 104. The configuration parameters may facilitate the first wireless tunnel connection 110a between the network server 104 and the virtual bridge 120. In some embodiments, the configuration parameters may include a source address (e.g., addressing for a first tunnel 112 and/or a second tunnel 114 between the network server 104 and the virtual bridge 120), a destination address (e.g., addressing for the first tunnel 112 and/or the second tunnel 114), authentication credentials (e.g., for encryption of data transmitted via the first tunnel 112 and/or the second tunnel 114), a threshold for one or more quality of service metrics that may be implemented during communications using the first tunnel 112 and/or the second tunnel 114 (e.g., number of packets transmitted per second, number of packets lost per transmission, transmission delays, etc.), and/or other parameters that may contribute to establishing the first tunnel 112 and/or the second tunnel 114 and/or observing the service provided therein.

In these or other embodiments, the network server 104 may be configured to generate the configuration file in response to obtaining the request for the configuration file from the first device 106. As described herein, the configuration file may be based on the configuration parameters determined from the request. The network server 104 may be configured to provide the configuration file to the first device 106, such as via the first wireless connection 108. For example, the network server 104 may transmit the configuration file to the first device 106 using the first wireless connection 108 via the wireless network 102.

In some embodiments, the configuration file may direct the first device 106 to establish the virtual bridge 120, such as between the first device 106 and the network server 104. In some embodiments, the configuration file may define the location and/or arrangement of the virtual bridge 120 relative to the network server 104, the first device 106, and/or the second device 116. For example, and as illustrated in FIG. 1, the configuration file may direct the first device 106 to establish the virtual bridge 120 between the first device 106 and the network server 104, such that the first device 106 and/or the second device 116 may be communicatively coupled with the network server 104 through the virtual bridge 120 (e.g., the first device 106 and the second device 116 may be communicatively coupled with the virtual bridge 120, which may be communicatively coupled with the network server 104 as described herein).

In some embodiments, the virtual bridge 120 may be configured to combine one or more networks such that the combined networks may operate as a single network and may share the same IP space. For example, the virtual bridge 120 may support a mesh network that the first device 106 and the second device 116 may be connected to, and the virtual bridge 120 may combine the mesh network with the local network 118, such that the first device 106, the second device 116, and the network server 104 may be communicatively coupled as though in the same network, such as with a wire (e.g., a pseudo wire having functionality like an ethernet cable such that the first device 106, the second device 116, and the network server 104 may share the same IP space and/or may communicate via link layer-based communications).

In another example, in instances in which the first device 106 is included in a first network and the second device 116 is included in a second network (e.g., the first device 106 may be the only device in the first network and the second device 116 may be the only device in the second network), the virtual bridge 120 may be configured to combine the first network, the second network and/or the local network 118, such that the first device 106, the second device 116, and the network server 104 may be communicatively coupled as though in the same network.

In some embodiments, the virtual bridge 120 may support communications between the first device 106 and the second device 116 which may include link layer-based communications. In some embodiments, the traffic associated with the communications between the first device 106 and the second device 116 may be routed through the virtual bridge 120 and may not be visible to the network server 104 and/or an operator of the network server 104 (e.g., the traffic associated with the communications between the first device 106 and the second device 116 may be encrypted and/or not accessible to the network server 104 although included in the same network via the virtual bridge 120).

In some embodiments, the configuration file may direct the first device 106 to establish a first tunnel 112 between the network server 104 and the virtual bridge 120. In some embodiments, the first tunnel 112 may facilitate the second wireless connection 110 as described herein. Alternatively, or additionally, the first tunnel 112 may be a component of the second wireless connection 110. For example, the first tunnel 112 may be used in conjunction with one or more tunnels and the combination thereof may facilitate the second wireless connection 110. In these or other embodiments, the first wireless tunnel connection 110a may be established over the wireless network 102 between the network server 104 and the virtual bridge 120.

In some embodiments, the first tunnel 112 may be established via a first layer of the internet protocol suite (e.g., transmission control protocol/internet protocol (TCP/IP)). For example, the first tunnel 112 may be an internet protocol security (IPsec) tunnel established via the internet layer of the internet protocol suite. In some embodiments, the first tunnel 112 may provide security and/or privacy to communications over the wireless network 102 via the first tunnel 112 using authentication credentials and/or encryption of data that may be included in the communications between devices using the first tunnel 112. Alternatively, or additionally, the first tunnel 112 may not support direct communications between connected devices as the connected devices may not be located in the same IP space. In such instances, a router and/or port forwarding rules may be employed to direct communications between devices that may be communicating using the first tunnel 112.

In some embodiments, the network server 104 may be configured to map the first tunnel 112 to the virtual bridge 120. Mapping the first tunnel 112 by the network server 104 may include obtaining addressing information related to at least the virtual bridge 120 and/or devices that may be connected to the virtual bridge 120 and configured to communicate using the first tunnel 112, such as the first device 106 and/or the second device 116. Alternatively, or additionally, the mapping of the first tunnel 112 by the network server 104 may include generating IP addresses that may be used in establishing the first tunnel 112 between the network server 104 and the virtual bridge 120. In some embodiments, the mapping performed by the network server 104 may enable IP layer communications between the network server 104 and the virtual bridge 120 and/or between the network server 104 and devices connected to the virtual bridge 120, such as the first device 106 and/or the second device 116.

In some embodiments, the configuration file may direct the first device 106 to establish the second tunnel 114 within the first tunnel 112. The second tunnel 114 may be established between the network server 104 and the virtual bridge 120. In some embodiments, the second tunnel 114 may be established after the first device 106 has established the first tunnel 112 between the network server 104 and the virtual bridge 120. In some embodiments, the second tunnel 114 may be a component of the second wireless connection 110. For example, the second tunnel 114 may be used in conjunction with one or more tunnels, such as the first tunnel 112, and the combination thereof may facilitate the second wireless connection 110.

In some embodiments, the second tunnel 114 may be established via a second layer of the internet protocol suite. For example, the second tunnel 114 may be a layer 2 tunneling protocol (L2TP) tunnel established via the link layer of the internet protocol suite. In some embodiments, the second tunnel 114 may provide transparency between the connected devices, such as the first device 106 and the second device 116 via the virtual bridge 120. For example, the first device 106 may be configured to communicate with the second device 116 with end-to-end transparency as the first device 106 and the second device 116 may utilize MAC addressing to communicate with one another and may not use the internet layer of the internet protocol suite to direct the communications between the first device 106 and the second device 116. For example, the second tunnel 114 may provide a communication channel between the network server 104 and the virtual bridge 120 that may be operably similar to the network server 104, the virtual bridge 120, the first device 106, and/or the second device 116 being connected with a wire (e.g., a pseudo wire having functionality like an ethernet cable), such that the first device 106, the second device 116, and/or the network server 104 may be included in the same IP space. In some embodiments, the first device 106 and the second device 116 may be configured to support IP-based traffic (e.g., addressing defined by RFC 1918) and/or non-IP-based traffic (e.g., circuit emulated time division multiplexing (TDM), recommended standard (RS)-232 (serial communications), high-definition multimedia interface (HDMI) over ethernet, etc.).

In some embodiments, the network server 104 may be configured to map the second tunnel 114 to the virtual bridge 120 within the first tunnel 112. Mapping the second tunnel 114 by the network server 104 may include obtaining addressing information related to at least the virtual bridge 120 and/or devices that may be connected to the virtual bridge 120 and configured to communicate using the second tunnel 114, such as the first device 106 and/or the second device 116. Alternatively, or additionally, the mapping of the second tunnel 114 by the network server 104 may include generating IP addresses that may be used in establishing the second tunnel 114 between the network server 104 and the virtual bridge 120. In some embodiments, the mapping performed by the network server 104 relative to the second tunnel 114 may enable link layer communications between the network server 104 and the virtual bridge 120 and/or between the network server 104 and devices connected to the virtual bridge 120, such as the first device 106 and/or the second device 116.

In some embodiments, the communications between the first device 106 and the second device 116 using the virtual bridge 120 and via the second tunnel 114 may be performed without a router and/or port forwarding rules including instances in which a NAT protocol is utilized by the first device 106 and/or the second device 116. Alternatively, or additionally, in instances in which NAT protocol is not included in the first device 106 and/or the second device 116, communications between the first device 106 and the second device 116 via the second tunnel 114 may be performed without a router and/or port forwarding rules.

In some embodiments, the second wireless connection 110 between the first device 106, the second device 116, the virtual bridge 120, and/or the network server 104 via the first tunnel 112 and the second tunnel 114, may be established without changes to the local network 118 associated with the network server 104. For example, the second wireless connection 110 may be ad hoc (e.g., established with little or no planning between the network server 104, the first device 106, the second device 116, and the virtual bridge 120) between the network server 104, the first device 106, the second device 116, and/or the virtual bridge 120 and may not precipitate changes to the local network 118. Alternatively, or additionally, the first tunnel 112 and/or the second tunnel 114 may be automatically established and/or configured via the configuration parameters included in the configuration file, such that the network server 104, the first device 106, the second device 116, and/or the virtual bridge 120 individually may not include any pre-provisioning (e.g., manual, or otherwise, as described herein) prior to the first device 106 obtaining the configuration file. For example, the first device 106 may be deployed remote (e.g., not connected in the same IP space) from the network server 104 and/or the local network 118 and the first device 106 may use the wireless network 102 to communicate with the network server 104 to establish the first tunnel 112 and the second tunnel 114 through the wireless network 102 and between the network server 104 and the virtual bridge 120, such that the first device 106 may be in the same IP space as the second device 116 and/or the network server 104 (e.g., communications between the first device 106 and the second device 116 may be at the link layer of the internet protocol suite), all of which may be accomplished without the network server 104, the first device 106, the second device 116, and/or the virtual bridge 120 including any pre-determined addressing to one another.

Modifications, additions, or omissions may be made to the environment 100 without departing from the scope of the present disclosure. For example, in some embodiments, one or more additional devices may be communicatively coupled with the virtual bridge 120 and may be configured to communicate with the network server 104 and/or other devices (e.g., the first device 106 and/or the second device 116) through the virtual bridge 120. In some embodiments, the virtual bridge 120 may be configured to facilitate various network layouts between differing devices that may be communicatively coupled to the virtual bridge 120. For example, the virtual bridge 120 may facilitate a mesh network for two or more devices (e.g., the first device 106 and the second device 116), as described herein, and the virtual bridge 120 may facilitate direct communications between two or more devices that may not be included in the mesh network (e.g., a third device and a fourth device, not illustrated in FIG. 1). In these or other embodiments, the configuration file obtained by the first device 106 may direct the virtual bridge 120 to establish the various network layouts, which configuration file may be in response to the request for the configuration file generated by the first device 106 (e.g., the user of the first device 106). In some embodiments, the location of the virtual bridge 120, such as relative to the first device 106, the second device 116, the network server 104, and/or the connections with the virtual bridge 120 may be directed by the configuration file. For example, the virtual bridge 120 may be communicatively coupled with the first device 106 which may, in turn, be communicatively coupled with the second device 116. Additionally, in some embodiments, the environment 100 may include any number of other components that may not be explicitly illustrated or described.

Figure 2:
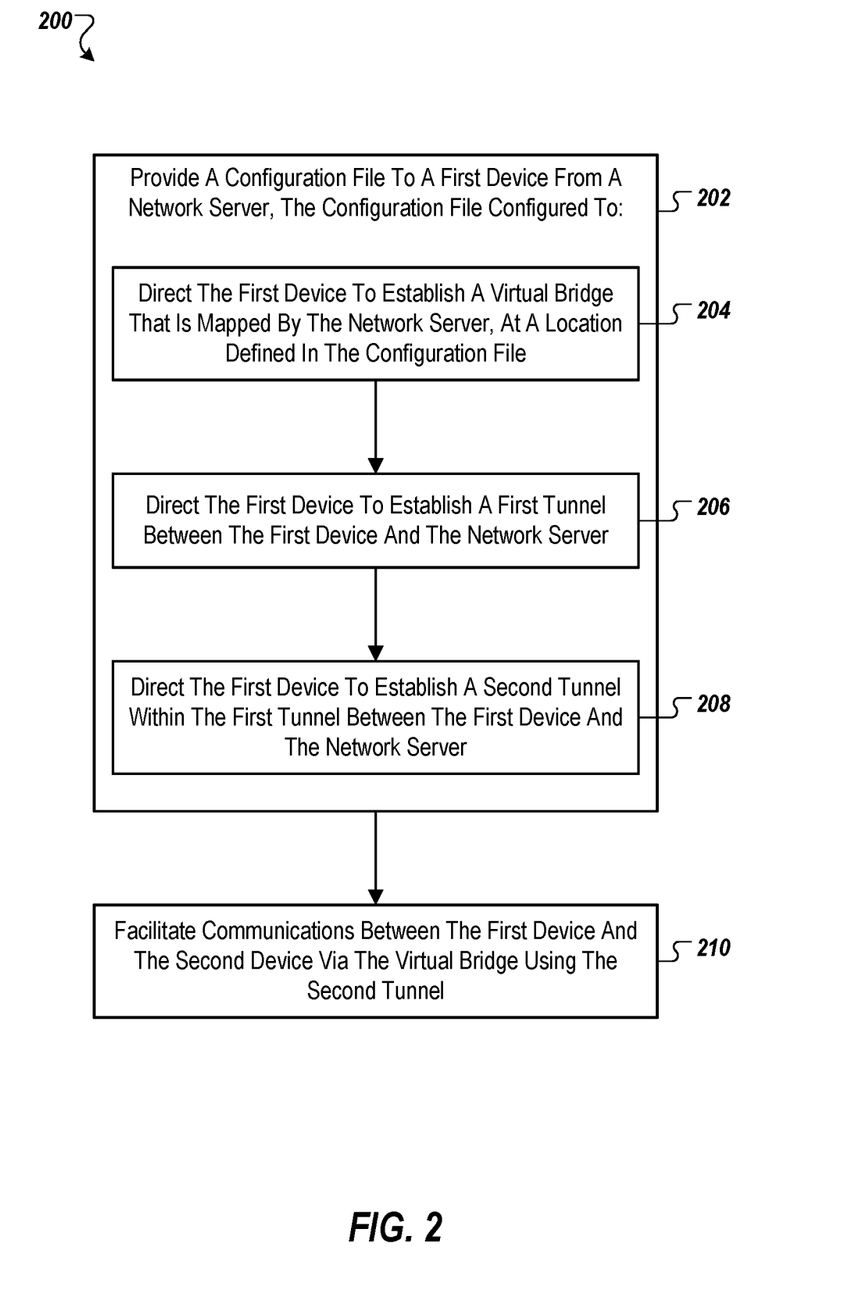
FIG. 2 is a flowchart of an example method of a mesh network using transparent tunneling over a wireless network.

FIG. 2 is a flowchart of an example method 200 of a mesh network using transparent tunneling over a wireless network, in accordance with at least one embodiment of the present disclosure. One or more operations of the method 200 may be performed, in some embodiments, by a device or system, or combination of devices or systems. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 202 where a configuration file may be provided to a first device (e.g., the first device 106 of FIG. 1) from a network server (e.g., the network server 104 of FIG. 1). In some embodiments, the configuration file may be provided after establishment of a first wireless connection (e.g., the first wireless connection 108 of FIG. 1) over a wireless network (e.g., the wireless network 102 of FIG. 1) between the first device and the network server. In some embodiments, the wireless network may include one or more cellular networks.

In some embodiments, the first device may utilize a network address translation (NAT) protocol for directing network traffic, which may include traffic over the wireless network. Alternatively, or additionally, the network server may utilize a NAT protocol for directing network traffic, which may include traffic over the wireless network. Alternatively, or additionally, a second device (e.g., the second device 116 of FIG. 1) may utilize a NAT protocol for directing network traffic, which may include traffic over the wireless network.

In some embodiments, a request from the first device for the configuration file may be obtained by the network server. In some embodiments, the request may include a request for at least virtual bridge addressing information that may be used to establish a second wireless connection (e.g., the first wireless tunnel connection 110a of FIG. 1) between the network server and a virtual bridge (e.g., the virtual bridge 120 of FIG. 1). Alternatively, or additionally, the request may include first device addressing information that may be used to establish a connection (e.g., the second wireless tunnel connection 110b of FIG. 1) between the first device and the virtual bridge. Alternatively, or additionally, the request may include second device addressing information that may be used to establish a connection (e.g., the third wireless tunnel connection 110c of FIG. 1) between the second device and the virtual bridge.

In some embodiments, one or more configuration parameters that may be included in the configuration file may be determined by the network server. In some embodiments, the configuration parameters may be configured to facilitate the second wireless connection between the network server and the virtual bridge. In some embodiments, the network server may provide the configuration file to the device. In some embodiments, the virtual bridge may be established at a location defined within the configuration file.

At block 204, the configuration file may direct the first device to establish the virtual bridge at a location defined within the configuration file. In some embodiments, the network server may be configured to map a first tunnel (e.g., the first tunnel 112 of FIG. 1) and a second tunnel (e.g., the second tunnel 114 of FIG. 1) to the virtual bridge. In some embodiments, the virtual bridge may be configured to provide a mesh network for wireless communications between at least the first device and the second device. In some embodiments, the virtual bridge may be configured to facilitate direct communications between the first device and the second device. In some embodiments, the virtual bridge may be configured to facilitate the first device and the second device communicating in an internet protocol (IP) space that may be the same as an IP space associated with the network server. In some embodiments, a first network associated with the first device may be combined with a second network associated with the network server via the virtual bridge.

At block 206, the configuration file may direct the first device to establish the first tunnel via a first layer of an internet protocol suite. In some embodiments, the first tunnel may be established via the second wireless connection over the wireless network between the network server and the virtual bridge. In some embodiments, the first tunnel may be an internet protocol security (IPsec) tunnel. In some embodiments, the first layer may be the internet layer of the internet protocol suite.

At block 208, the configuration file may direct the first device to establish the second tunnel within the first tunnel between the network server and the virtual bridge. In some embodiments, the second tunnel may be established via a second layer of the internet protocol suite. In some embodiments, the second tunnel may be a layer 2 tunneling protocol (L2TP) tunnel. In some embodiments, the L2TP tunnel may be configured to provide transparency between at least the first device and the second device. In some embodiments, the second layer may be the link layer of the internet protocol suite.

In some embodiments, the configuration file may include a source address for the first tunnel and a source address for the second tunnel. Alternatively, or additionally, the configuration file may include a destination address for the first tunnel and a destination address for the second tunnel. Alternatively, or additionally, the configuration file may include first authentication credentials for the first device and/or second authentication credentials for the second device. Alternatively, or additionally, the configuration file may include a threshold for one or more quality of service metrics that may be implemented during the communications between the first device and the second device.

At block 210, communications between at least the first device and the second device may be facilitated via the virtual bridge using the second tunnel. In some embodiments, the communications between the first device and the second device may include internet protocol (IP) traffic. Alternatively, or additionally, the communications between the first device and the second device may include non-IP traffic. In these or other embodiments, communications between the first device and the network server (e.g., via the virtual bridge and the second tunnel) and/or communications between the first device and the second device (e.g., via the virtual bridge) may bypass the NAT protocol associated with the first device, the NAT protocol associated with network server, and/or the NAT protocol associated with the second device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 3:
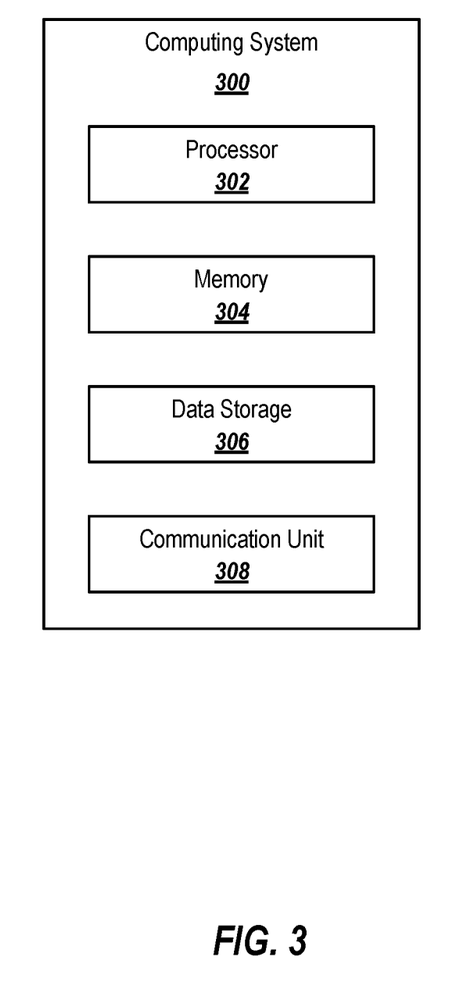
FIG. 3 illustrates an example computing system that may be used for a mesh network using transparent tunneling over a wireless network.

FIG. 3 illustrates an example computing system 300 that may be used for a mesh network using transparent tunneling over a wireless network, in accordance with at least one embodiment of the present disclosure. The computing system 300 may be configured to implement or direct one or more operations associated with a mesh network using transparent tunneling over a wireless network, which may include operation of one or more components included in the environment 100 of FIG. 1, such as the network server 104, the first device 106, the second device 116, and/or the virtual bridge 120, and/or performance of the method 200 of FIG. 2. The computing system 300 may include a processor 302, memory 304, data storage 306, and a communication unit 308, which all may be communicatively coupled. In some embodiments, the computing system 300 may be part of any of the systems or devices described in this disclosure.

The processor 302 may include any computing entity, or processing device including various computer hardware or software modules and may be configured to execute instructions stored on any applicable computer-readable storage media. For example, the processor 302 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 302 may include any number of processors distributed across any number of networks or physical locations that are configured to perform individually or collectively any number of operations described herein.

In some embodiments, the processor 302 may be configured to interpret and/or execute program instructions and/or process data stored in the memory 304, the data storage 306, or the memory 304 and the data storage 306. In some embodiments, the processor 302 may fetch program instructions from the data storage 306 and load the program instructions in the memory 304. After the program instructions are loaded into memory 304, the processor 302 may execute the program instructions.

For example, in some embodiments, the processor 302 may be configured to interpret and/or execute program instructions and/or process data stored in the memory 304, the data storage 306, or the memory 304 and the data storage 306. The program instruction and/or data may be related to a mesh network using transparent tunneling over a wireless network such that the computing system 300 may perform or direct the performance of the operations associated therewith as directed by the instructions. In these and other embodiments, the instructions may be used to perform the method 200 of FIG. 2.

The memory 304 and the data storage 306 may include computer-readable storage media or one or more computer-readable storage mediums for carrying or having computer-executable instructions or data structures stored thereon. Such computer-readable storage media may be any available media that may be accessed by a computer, such as the processor 302.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 302 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 308 may include any component, device, system, or combination thereof that is configured to transmit or receive information over a network. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMAX device, cellular communication facilities, etc.), and/or the like. The communication unit 308 may permit data to be exchanged with a network and/or any other devices or systems described in the present disclosure.

Modifications, additions, or omissions may be made to the computing system 300 without departing from the scope of the present disclosure. For example, in some embodiments, the computing system 300 may include any number of other components that may not be explicitly illustrated or described. Further, depending on certain implementations, the computing system 300 may not include one or more of the components illustrated and described.

As indicated above, the embodiments described herein may include the use of a computing system (e.g., the processor 302 of FIG. 3) including various computer hardware or software modules. Further, as indicated above, embodiments described herein may be implemented using computer-readable media (e.g., the memory 304 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    after establishment of a first wireless connection over a wireless network between a first device and a network server, providing a configuration file to the first device from the network server, the configuration file configured to:
        direct the first device to establish a virtual bridge at a location defined within the configuration file, the network server configured to map a first tunnel and a second tunnel to the virtual bridge, and the virtual bridge configured to provide a mesh network for wireless communications between at least the first device and a second device;
        direct the first device to establish the first tunnel via a first layer of an internet protocol suite via a second wireless connection over the wireless network between the virtual bridge and the network server;
        direct the first device to establish the second tunnel within the first tunnel between the virtual bridge and the network server, the second tunnel established via a second layer of the internet protocol suite; and
    facilitating communications between at least the first device and the second device via the virtual bridge using the second tunnel.

2. The method of claim 1, wherein the first device utilizes a network address translation (NAT) protocol for directing network traffic.

3. The method of claim 1, further comprising:
    obtaining, from the first device, a request for the configuration file from the network server, the request including, at least:
        virtual bridge addressing information to establish the second wireless connection between the network server and the virtual bridge;
        first device addressing information to establish a connection between the first device and the virtual bridge; and
        second device addressing information to establish a connection between the second device and the virtual bridge;
    determining, by the network server, one or more configuration parameters to be included in the configuration file, the configuration parameters configured to facilitate the second wireless connection between the network server and the virtual bridge;
    providing the configuration file to the first device; and
    establishing the virtual bridge at the location defined within the configuration file.

4. The method of claim 1, wherein the wireless network includes one or more cellular networks.

5. The method of claim 1, wherein the configuration file includes source addresses for the first tunnel and the second tunnel, destination addresses for the first tunnel and the second tunnel, first authentication credentials for the first device, second authentication credentials for the second device, and a threshold for one or more quality of service metrics that are implemented during the communications between the first device and the second device.

6. The method of claim 1, wherein the first tunnel is an internet protocol security (IPsec) tunnel, and the second tunnel is a layer 2 tunneling protocol (L2TP) tunnel, the second tunnel configured to provide transparency between the first device and the second device.

7. The method of claim 1, wherein the first layer is the internet layer of an internet protocol suite, and the second layer is a link layer of the internet protocol suite.

8. The method of claim 1, wherein the virtual bridge is configured to facilitate direct communications between the first device and the second device.

9. The method of claim 1, wherein the first device and second device are configured to communicate in an internet protocol (IP) space that is the same as an IP space associated with the network server.

10. The method of claim 1, wherein a first network associated with the first device is combined with a second network associated with the network server via the virtual bridge.

11. The method of claim 1, wherein the communications between the first device and the second device include internet protocol (IP) traffic and non-IP traffic.

12. A system comprising:
one or more computer-readable storage media configured to store instructions; and
one or more processors communicatively coupled to the one or more computer-readable storage media and configured to, in response to execution of the instructions, cause the system to perform operations, the operations comprising:
  after establishment of a first wireless connection over a wireless network between a first device and a network server, providing a configuration file to the first device from the network server, the configuration file configured to:
    direct the first device to establish a virtual bridge at a location defined within the configuration file, the network server configured to map a first tunnel and a second tunnel to the virtual bridge, and the virtual bridge configured to provide a mesh network for wireless communications between at least the first device and a second device;
    direct the first device to establish the first tunnel via a first layer of an internet protocol suite via a second wireless connection over the wireless network between the virtual bridge and the network server;
    direct the first device to establish the second tunnel within the first tunnel between the virtual bridge and the network server, the second tunnel established via a second layer of the internet protocol suite; and
  facilitating communications between at least the first device and the second device via the virtual bridge using the second tunnel.

13. The system of claim 12, wherein the first device utilizes a network address translation (NAT) protocol for directing network traffic.

14. The system of claim 12, further comprising:
obtaining, from the first device, a request for the configuration file from the network server, the request including, at least:
  virtual bridge addressing information to establish the second wireless connection between the network server and the virtual bridge;
  first device addressing information to establish a connection between the first device and the virtual bridge; and
  second device addressing information to establish a connection between the second device and the virtual bridge;
determining, by the network server, one or more configuration parameters to be included in the configuration file, the configuration parameters configured to facilitate the second wireless connection between the network server and the virtual bridge;
providing the configuration file to the first device; and
establishing the virtual bridge at the location defined within the configuration file.

15. The system of claim 12, wherein the wireless network includes one or more cellular networks.

16. The system of claim 12, wherein the configuration file includes source addresses for the first tunnel and the second tunnel, destination addresses for the first tunnel and the second tunnel, first authentication credentials for the first device, second authentication credentials for the second device, and a threshold for one or more quality of service metrics that are implemented during the communications between the first device and the second device.

17. The system of claim 12, wherein the first tunnel is an internet protocol security (IPsec) tunnel, and the second tunnel is a layer 2 tunneling protocol (L2TP) tunnel, the second tunnel configured to provide transparency between the first device and the second device.

18. The system of claim 12, wherein the first layer is an internet layer of the internet protocol suite, and the second layer is a link layer of the internet protocol suite.

19. The system of claim 12, wherein the virtual bridge is configured to provide direct communications between the first device and the second device.

20. The system of claim 12, wherein the communications between the first device and the second device include internet protocol (IP) traffic and non-IP traffic.

* * * * *